Patented Dec. 8, 1936

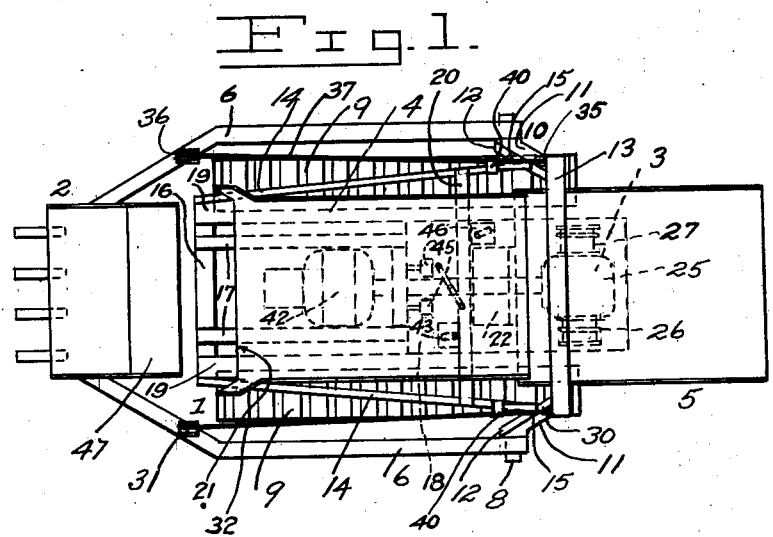

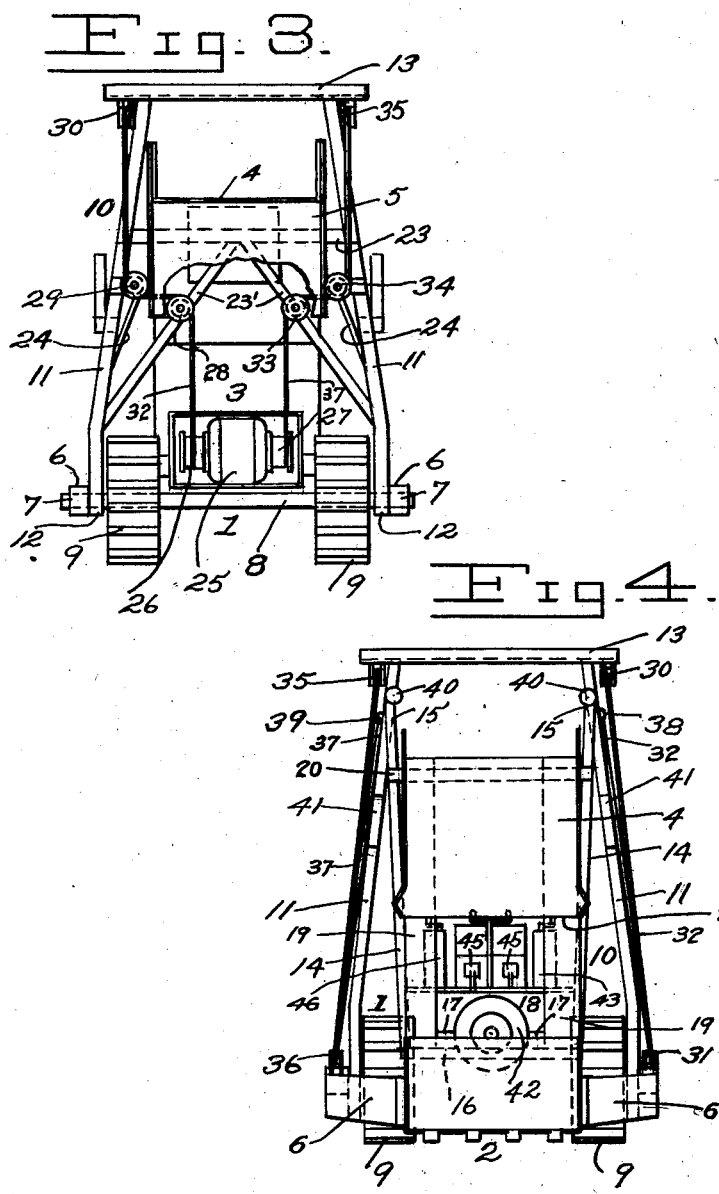

2,063,214

UNITED STATES PATENT OFFICE 2,063,214

MUCKING AND LOADING MACHINE

Saul Lester Wixson and Bernard Williams, Boulder City, Nev.

Application July 29, 1935, Serial No. 33,734

4 Claims. (Cl. 214—130)

This invention relates to excavating machines, and more particularly to mucking and loading machines.

The general object of the invention is to provide a mucking and loading machine which may be operated to advantage in narrow places or small areas, for mucking dirt and loading the same on trucks to be driven away for the excavation.

Another object is to provide a mucking and loading machine of the character stated, which is compact and easily handled, and highly efficient and economical in operation.

Other objects and advantages will appear hereinafter as this specification progresses.

The invention is illustrated in the annexed drawings which form a part of this specification and in which, Fig. 1 is a plan view of our invention.
Fig. 2 is a side elevation of our invention.
Fig. 3 is a rear elevation of our invention.
Fig. 4 is a front elevation of our invention.

Referring more particularly to the drawings, in which corresponding parts are designated by the same reference characters in all of the figures, our invention comprises generally a tractor 1, a mucking shovel 2, shovel-operating means 3, an arcuate conveyor trough 4 through which said shovel conveys the mucked dirt from in front of said tractor upwardly and rearwardly to the rear of said tractor, and a discharge chute 5 leading downwardly and rearwardly from the rear upper end of said conveyor trough.

The shovel 2 is secured at its sides respectively to the forward ends of a pair of swinging arms 6, which are pivotally mounted by bearings 7 at their rear ends on the ends respectively of the rear axle 8 of the tractor 1, outside the tractor treads 9 respectively.

On the tractor 1 is mounted a supporting frame 10 comprising a pair of uprights 11, supported at their lower ends by bearings 12 on the outer end portions respectively of the rear axle 8 of the tractor 1, between the tractor treads 9 and the shovel arms 6, a cross beam 13 connecting the upper ends of said uprights 11, a pair of angle beam braces 14 connected at their rear upper ends at 15 to the upper ends of said uprights 11 respectively and connected at their lower forward ends to the ends respectively of a cross beam 16 at the forward ends of the tractor treads 9, a pair of arms 17 secured at their rear ends to the tractor frame 18 and supporting at their forward ends the cross beam 16 which is secured to the under side of said arms 17, a pair of spaced arcuate truss bars 19 which support the conveyor trough 4 and are secured at their lower forward ends to the ends respectively of said cross beam 16, and a cross beam 20 secured at its ends to the angle brace beams 14, over which cross beam 20 extend the upper ends of said arcuate truss bars 19 and to which cross beam said truss bars are secured at their upper end portions. The conveyor trough 4 is of such length and is secured on the truss bars 19 in such position, that its lower end 21 rests at a distance above the tractor 1, so that the operator of the machine, sitting on the tractor seat 22, may see forwardly of the machine under said lower forward end of said conveyor trough, while the upper end of said conveyor trough extends into the upper end of the discharge chute 5. The upper end of the discharge chute 5 is supported between the upper portions of the uprights 11 upon a cross beam 23 extending between and secured at its ends respectively to said uprights, and said chute is further supported rearwardly of said uprights by angle braces 24 secured at their lower ends to said uprights and at their upper ends to said chute.

The shovel-operating means 3 comprises a motor 25, a pair of drums 26 and 27 on the shaft of said motor at the left and right thereof respectively, sheaves 28, 29, 30 and 31, a cable 32 wound on the drum 26 and extending over said sheaves, sheaves 33, 34, 35, and 36, and a cable 37 wound on the drum 27 and extending over said sheaves 33, 34, 35 and 36. The sheaves 28 and 33 are mounted on a pair of angle braces 23' respectively, secured at their lower ends to the lower portions of the uprights 11 respectively, and at their upper ends to the cross beam 23. The sheaves 29 and 34 are mounted on the uprights 11 respectively. The sheaves 30 and 35 are suspended from the ends respectively of the uppermost cross beam 13. The sheaves 31 and 36 are mounted on the outer ends of the shovel arms 6 respectively. The ends of the cables 32 and 37 remote from the drums 26 and 27 respectively are secured at 38 and 39 to the uprights 11 respectively near the upper ends thereof.

Bumpers 40 are mounted on the upper ends of the uprights 11 respectively and extend forwardly of said uprights, against which strike the shovel arms 6, whereby the upward swinging movement of the shovel 2 is limited at the upper rear end of the conveyor trough 4 and at the upper forward end of the discharge chute 5.

Flat springs 41 are secured to the uprights 11 respectively for engaging the shovel arms 6 and swinging said arms and the shovel 2 forwardly over the vertical dead center extending through the tractor rear axle 8, so that the shovel will drop to its lowermost position by gravity, thus preventing the shovel from remaining in an upright position, when the drum motor 25 is stopped, and particularly when the tractor is on an incline with its forward end higher than its rear end.

The tractor motor 42 is controlled by the conventional controller 43 within reach of the operator sitting in the tractor seat 22. The tractor brakes 44 are controlled by foot pedals 45. The shovel cable drum motor 25 is controlled by a controller 46 within reach of the operator sitting in the tractor seat 22. The tractor is steered by the conventional friction lever 48 for the brakes 44 respectively.

The operation of our invention is as follows:

The shovel 2 being down in position for shoveling dirt, the operator, by means of the controller 43, drives the tractor 1 forwardly until the shovel scoops up a shovel full of dirt, whereupon the operator, by means of the controller 43, stops the tractor and, by means of controller 46, operates the cable-drum motor 25, which rotates the cable drums 26 and 27, and said drums, winding the cables 32 and 37 respectively thereon, swing the shovel 2 upwardly and rearwardly over the tractor through the conveyor trough 4 to the upper rear end of said trough and to the upper forward end of the discharge chute 5 against the bumpers 40 and springs 41, whereupon the dirt is discharged from the shovel over its rear inclined wall 47 into the upper end of the discharge chute 5 and downwardly through said chute into a truck below the lower end of said chute. The operator then, by means of the controller 46, stops the motor 25 and winding drums 26 and 27, and the shovel 2, assisted by the springs 41, drops downwardly to its lowermost position in front of the tractor. The above-described operations are repeated, with said truck following the machine until it is loaded with dirt by the machine. Said truck is then driven away from the pile of dirt to a dumping place, and other trucks are successively driven under the lower end of said discharge chute and loaded by the machine, as required.

We do not limit our invention to the exact construction herein disclosed because variations and modifications may be made without departing from the spirit of the invention. We reserve the right to all such variations and modifications.

We claim:

1. A mucking machine comprising a tractor, a mucking shovel mounted on said tractor for shoveling dirt and for swinging upwardly and rearwardly over said tractor, a conveyor trough fixedly mounted on said tractor and extending longitudinally upwardly and rearwardly over the same, a discharge chute mounted on said tractor, leading from the upper rear end of said conveyor trough, and means for swinging said shovel, with a load of dirt, upwardly and rearwardly through said conveyor trough to said discharge chute into which the dirt discharges from said shovel.

2. A mucking machine comprising a tractor, a mucking shovel, a pair of shovel arms to which said shovel is secured, said arms being pivotally mounted on the machine, a conveyor trough fixedly mounted on said tractor and extending longitudinally upwardly and rearwardly over the same; drums mounted on the machine, sheaves mounted on the machine, two of which are mounted on said shovel arms, cables wound on said drums and extending over said sheaves and connected at their ends remote from said drums to fixed points on the machine, and means for rotating said drums for winding said cables thereon and swinging said arms and shovel, with a load of dirt, upwardly and rearwardly through said conveyor trough over said tractor to a point where the dirt discharges from said shovel.

3. A mucking machine comprising a tractor, a pair of shovel arms turnably mounted on the rear axle of said tractor, a mucking shovel mounted on the forward ends of said arms, an arcuate conveyor trough described from the center of said rear axle and fixedly mounted on the machine, extending longitudinally upwardly and rearwardly over said tractor, and means for swinging said shovel arms and shovel upwardly and rearwardly through said conveyor trough to the upper rear end thereof where the dirt is discharged from said shovel.

4. A mucking machine comprising a tractor, a mucking shovel mounted on said tractor for shoveling dirt and for swinging upwardly and rearwardly over said tractor, a conveyor trough fixedly mounted on said tractor and extending longitudinally upwardly and rearwardly over the same, and means for swinging said shovel, with a load of dirt, upwardly and rearwardly through said trough to the upper end of said trough where the dirt is discharged from said shovel and trough.

SAUL LESTER WIXSON.
BERNARD WILLIAMS.